Patented Nov. 14, 1933

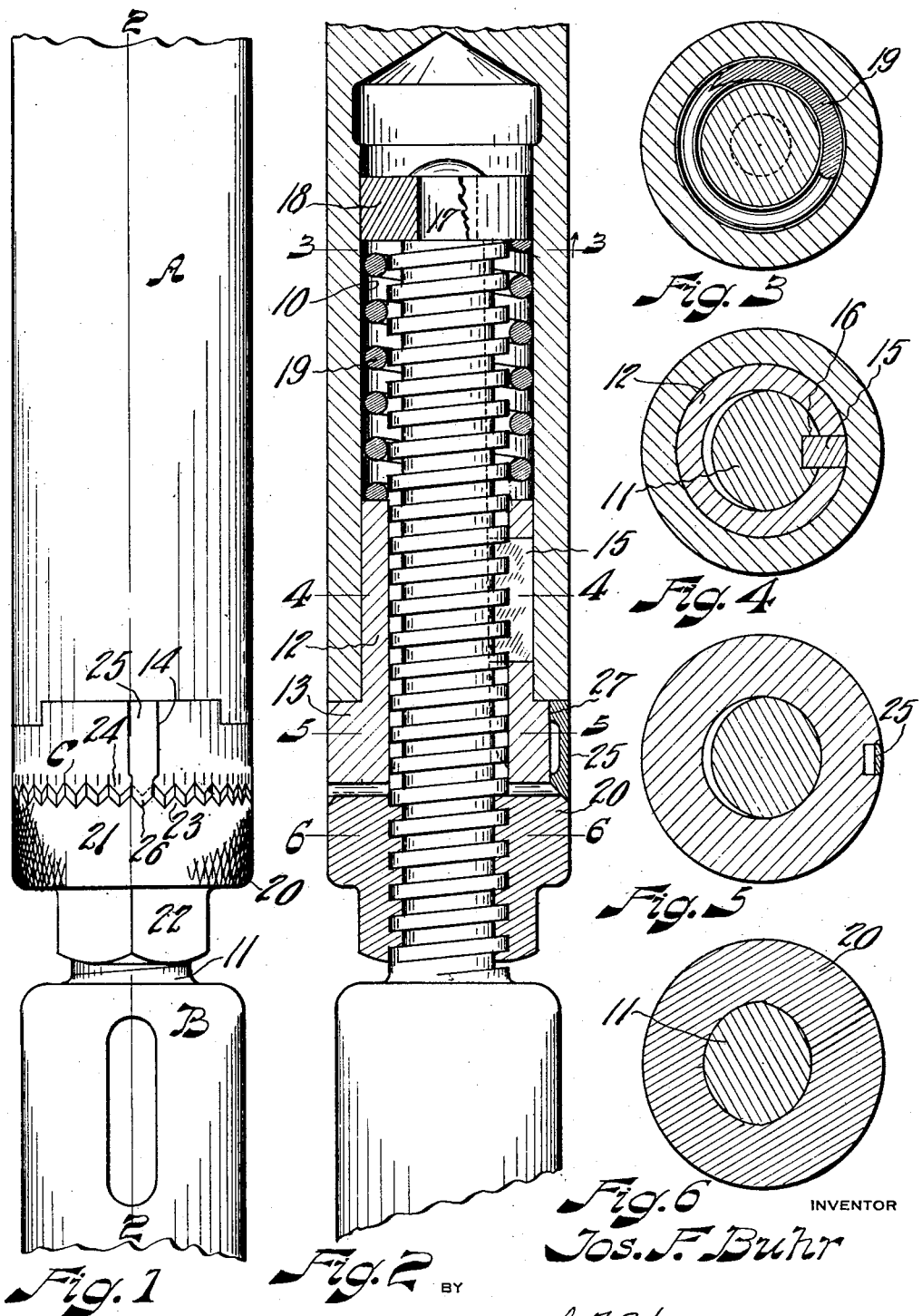

1,934,910

UNITED STATES PATENT OFFICE 1,934,910

COLLET MEANS

Joseph F. Buhr, Ann Arbor, Mich., assignor to Buhr Machine Tool Company, Ann Arbor, Mich.

Application December 8, 1932. Serial No. 646,289

10 Claims. (Cl. 279—9)

The present invention is partly disclosed in my Patent No. 1,845,123, issued on February 16, 1932, and is an improvement thereon.

My invention relates to collet means more specifically described herein below.

Objects of my invention are:

To provide a simple means to retain and to adjust a collet structure longitudinally in a spindle or the like;

To provide means on such a device whereby such adjustment is effected by means on the outside thereof so that no part thereof needs to be removed or loosened or otherwise manipulated independent of the device;

To provide means on such a device to normally retain members thereof in adjusted relations so that adjustment is not varied by and during operation of the device but is easily and conveniently and manually made when desired;

To provide means on such a device to use the means which hold the parts of the device together for putting a longitudinal load on a collet to mitagate breaking of tools;

To provide a spring or equivalent means on such a device to hold the parts thereof together.

Other objects will be pointed out in this specification or will become obvious or apparent upon inspection of this specification and the accompanying drawing.

In the prior art, collets and the like are held in spindles by a taper shank and are not adjustable longitudinally therein on account of the taper shank. When straight shanks are used there must be some extraneous means to hold the collet longitudinally to the spindle. There is no longitudinal load put on the collet by the means which holds the collet parts together. There is no provision to longitudinally adjust the collet in relation to the spindle which provision does not require some sort of loosening of one or more parts before adjustment can be made and must be tightened against after adjustment is made.

I attain my objects by mechanism illustratively shown in the accompanying drawing in which:

Fig. 1 is a side view of a part of a collet in the end of a spindle and including the features of my invention.

Fig. 2 is a longitudinal section taken on the line 2—2 of Fig. 1.

Fig. 3 is a transverse section taken on the line 3—3 of Fig. 2.

Fig. 4 is a transverse section taken on the line 4—4 of Fig. 2.

Fig. 5 is a transverse section taken on the line 5—5 of Fig. 2.

Fig. 6 is a transverse section taken on the line 6—6 of Fig. 2.

Similar reference characters refer to similar parts throughout the views.

The spindle A may be a part of any machine, is rotatable in its usual function, and, as shown, is internally round and has the open ended bore 10 in one end thereof. In this instance, this bore is straight and smooth through its entire length except the extreme inner end thereof which is relieved to facilitate the boring or machining of the straight part of the bore.

The collet B has the lower part thereof of any suitable form for reception of tools or tool shank or the like as is usual in collets.

The shank 11 forms the upper part of the collet and is externally threaded. In the instance shown, the thread is a square thread to provide as much bearing surface as possible for purposes appearing presently. Any other form of thread may be used but it is preferred that there is at least some flat surface on the tops of the threads.

The sleeve 12 fits into the end of the bore 10 and has the head 13 abutting the end of the spindle. The keyed relation between the sleeve and the spindle shown at 14 in Fig. 1 prevents rotation of the sleeve in relation to the spindle. The key 15 is mounted in the sleeve 12 and one side thereof projects into the keyway 16 in the shank and extends longitudinally thereof so that the shank can move longitudinally in the bore 10 and in the sleeve without rotating in either one of them.

The end of the shank has the diametrically reduced part 17 and the collar 18 shown thereon. The collar fits longitudinally slidably into the bore 10 and thereby steadies the end of the shank and centralizes the same in the bore.

The spring 19 or other equivalent member is located in the upper end of the bore 10 and embraces the end of the shank and one end thereof abuts the collar 18 and the other end thereof abuts the inner end of the sleeve 12. The spring is normally under compression and thereby tends to move the shank longitudinally in the bore.

The adjusting nut 20 is threaded onto the shank and has the knurled part 21 as a take hold means by hand and the polygonal part 22 to receive a wrench or equivalent tool to rotate the adjusting nut.

The outer end of the sleeve 12 has the serrations 23 and the end of the adjusting nut 20 adjacent to the sleeve has the serrations 24 corresponding to the serrations 23. The serrations are shown with angular sides so that the same fit better to each other and to move easily out of engagement with each other upon relative rotation between the sleeve and the adjusting nut for purposes appearing below.

The locking member 25 has the end 26 adapted to engage the serrations 24 as the adjusting nut is rotated and thereby retains the adjusting nut against self or accidental rotation. The locking member 25 is mounted in a groove to keep the outside of the device as free as possible of projections and has the end 27 secured to the bottom of the groove by spot welding or other means. The body part of the locking member is lighter in cross-section than the ends thereof to render the same more resilient so that the end 26 can move into and out of contact with the serrations 24 when the adjusting nut is rotated in relation to the sleeve In normal operation of the device shown and described, the spring 19 is under compression and abuts the longitudinally movable collar 18 and the end of the positionally fixed sleeve 12 endwise and by that abutment tends to move the shank longitudinally in the bore 10 and inwardly of the spindle and this tendency of movement of the shank tends to hold the collet longitudinally on the spindle by moving the serrations 24 on the adjusting nut in mesh and locking contact with the serrations 23 and thereby prevents accidental or self or other undesirable rotation of the adjusting nut in relation to the collet and the sleeve and the spindle so that the spindle and the collet therein rotate in unison.

This longitudinal holding together of the collet in relation to the spindle by the spring also pre-loads the collet in a yieldable manner so that the collet can move outwardly of the spindle when a longitudinal load is brought upon the collet and when this load is greater than the compression pressure of the spring. The compression pressure of the spring is adjusted so that the collet can move longitudinally outwardly of the spindle only when a definite longitudinal load is brought on the collet to so move the same outwardly. The object of this pre-loading of the collet is to prevent breaking of tools or other undesirable features which may arise or may be found in the prior art by reason of a collet being too rigidly held to a spindle.

When it is desired to adjust the longitudinal relation between the collet and the spindle, the adjusting nut is rotated in relation to the sleeve and the spindle and the collet unrotative in the sleeve. This rotation of the nut moves the collet longitudinally inwardly or longitudinally outwardly of the spindle depending upon the direction of rotation of the nut and thereby adjusts the longitudinal relation between the collet and the spindle.

During rotation of the adjusting nut, the end 26 of the locking member 25 is forced out of the serration 24 due to the inclined sides of the serrations and of the end 26 but will locate itself in one of the serrations due to the resiliency of the body of the member 25 when an adjustment has been made and the nut comes to rest and thereby holds the adjusting nut against self or accidental rotation in relation to the sleeve and the spindle and the collet.

The graduation marks C may be applied either to the sleeve as shown or to the adjusting nut for a guide means to determine or externally read as to how much adjustment has been made or is being made. The spacing of the graduation marks bears a certain ratio to the pitch of the thread on the shank so that the reading of the graduation marks corresponds to a standard scale of measurement.

I am aware that changes and modifications can be made in the structure and arrangements of parts from the showing and description herein specifically and illustratively set forth, within the spirit and intent of my invention and of the appended claims. Therefore, without limiting myself to the precise structure as shown and described,

I claim:

1. A spindle having a bore in an end thereof, a collet having an externally threaded shank movable longitudinally but unrotatable in said bore, a sleeve in said end of said spindle and rotating therewith and fitting to the tops of said threads on said shank, an individually rotatable adjusting nut threaded onto said shank and endwise abutting said sleeve, and a spring under compression in said bore and longitudinally abutting a collar on said shank and said sleeve to hold said adjusting nut endwise against said sleeve.

2. A spindle having a bore in an end thereof, a collet having an externally threaded shank longitudinally movable but unrotatable in said bore, a sleeve in said end of said bore and rotatable therewith and fitting to the tops of said threads on the shank, a key between said shank and said sleeve to prevent rotation of said shank in said bore, an adjusting nut threaded onto said shank and endwise abutting said sleeve, and a spring under tension in said bore and longitudinally abutting a shoulder on said shank and a shoulder on said sleeve to hold said adjusting nut endwise against said sleeve.

3. A member having a bore in an end thereof, a collet having an externally threaded shank extending into and unrotatable in said bore, a sleeve unrotatable in said bore and embracing said shank and having serrations on an end thereof, an adjusting nut threaded onto said shank and having serrations on an end thereof corresponding to the serrations on said sleeve for indicating longitudinal adjustment of said collet in said spindle, and a spring in said bore and abutting a shoulder on said shank and a shoulder on said sleeve to normally retain said serrations in contact with each other.

4. A spindle having a bore in an end thereof, a sleeve in the end of said bore and having serrations on the outer end thereof, a collet having a shank journaled in said sleeve and extending loosely into said bore, a collar on the end of said shank and longitudinally slidably fitting to said bore, an adjusting nut threaded onto said shank and having serrations therein conforming to and abutting said serrations on said sleeve, means for normally holding said collet in longitudinal relation to said spindle and said serrations in contact with each other, and a locking means to prevent accidental relative rotation between said sleeve and said adjusting nut.

5. A member having a bore in an end thereof, a collet having a shank unrotatably but longitudinally adjustably extending into a bore, an adjusting member engaging said member and said collet for relative adjustment of said member and said collet, and a spring engaging said member with the bore and engaging a collar on said collet to automatically hold said collet to said member with the bore upon completion of an adjusting movement of said adjusting member.

6. A member having a bore in an end thereof, a collet having a shank unrotatably but longitudinally adjustably extending into said bore, means for adjusting said shank longitudinally in said bore and out of said bore for disassembly, and a spring under compression in said bore and engaging a shoulder on said member and engaging a shoulder on said shank to normally hold said collet in longitudinal abutment on said member.

7. A member having a bore in an end thereof, a sleeve in said bore for assembly of said member and said collet, an end of said sleeve forming a shoulder in said bore, a collet held in longitudinal relation to said member and having an externally threaded part extending unrotatably into said bore and guided in said sleeve for longitudinal unrotatable movement therein, an adjusting member threaded to said threaded part and held in endwise abutment on said sleeve, a collar on the inner end of said part and longitudinally slidably fitting to said bore to guide the inner end of said collet relative to said member, and a spring between said collar and said shoulder to hold said adjusting member in abutment on said sleeve and to hold said member and said collet in longitudinal relation.

8. A collet means comprising telescopically related relatively unrotatable socket and collet members, an individually rotatable threaded member in contact engagement with said socket and said collet members to adjust the telescopic relation of the same, and resiliently mounted means to automatically retain said socket and said collet members in telescopically adjusted relation and to automatically release the engagement between said socket and collet members upon rotation of said individually rotatable member and to automatically retain said individually rotatable member against self rotation and to automatically release the latter engagement upon rotation of said individually rotatable member.

9. A collet means comprising telescopically related, relatively unrotatable socket and collet members, an individually rotatable threaded member in contact engagement with said socket and collet members to telescopically adjust the telescopic relation of the same, a resilient means normally under pressure to releasably retain said socket and collet members in adjusted telescopic relation automatically, and resilient means to automatically releasably retain said individually rotatable member against self rotation automatically.

10. A collet means comprising telescopically related, relatively unrotatable socket and collet members, an individually rotatable adjusting member to adjustably vary the telescopic relation of said socket and collet members, a resilient means between said adjusting member and said socket member to normally retain said adjusting member against self rotation and automatically releasable upon rotation of said adjusting member, and a resilient pressure means between said socket and collet members to releasably retain the same in adjusted telescopic relation.

JOSEPH F. BUHR.